United States Patent [19]
Sadr et al.

[11] Patent Number: 5,971,062
[45] Date of Patent: Oct. 26, 1999

[54] FAN SHROUD WITH INTEGRATED RESERVOIRS

[75] Inventors: Changize Sadr, North York; Timothy W. Chapman, Pickering, both of Canada

[73] Assignee: Salflex Polymers Ltd., Ontario, Canada

[21] Appl. No.: 09/120,316

[22] Filed: Jul. 22, 1998

[51] Int. Cl.⁶ ..................................................... F01P 11/02
[52] U.S. Cl. ...................... 165/104.32; 165/41; 165/122; 165/132; 123/41.54
[58] Field of Search ................ 165/104.32, 41, 165/132, 122; 123/41.54

[56] References Cited

U.S. PATENT DOCUMENTS

| | | | |
|---|---|---|---|
| 3,692,004 | 9/1972 | Tangue et al. | |
| 5,329,889 | 7/1994 | Caldwell | 123/41.54 |
| 5,456,218 | 10/1995 | Theorell | 123/41.54 |
| 5,649,587 | 7/1997 | Plant | |
| 5,829,268 | 11/1998 | Mertens | 62/503 |

*Primary Examiner*—Allen Flanigan
*Attorney, Agent, or Firm*—Bereskin & Parr

[57] ABSTRACT

A fan shroud for use with a cooling fan adjacent to the radiator for a water cooled internal combustion engine includes a generally central opening for directing flow of air to or from a radiator. The fan shroud includes at least one integral chamber for storage of other liquids typically used with a vehicle which may be under pressure. To facilitate handling pressure, the storage chamber includes a plurality of individual storage modules which are interconnected by a plurality of fluid flow channels so that the total storage capacity of the chamber is the sum of the storage capacity of the modules and interconnecting fluid flow channels. The modules and channels are made by bringing the front and back walls of a blow molded fan shroud into contact with each other to define there between channels and modules. Advantageously, the shroud comprises several such chambers and may be used to house engine coolant, power steering fluid or other fluids. In addition, the fan shroud can include chambers for storing fluids which are not necessarily under pressure such as windshield washer fluid and the like.

11 Claims, 3 Drawing Sheets

FAN SHROUD WITH INTEGRATED RESERVOIRS

FIELD OF THE INVENTION

This invention relates generally to automotive radiator fan shrouds and more particularly to shrouds which have internal, hollow, closed chambers which may be used as reservoirs for fluids, and in particular, engine coolants and other fluids such as washer fluid for windshields and lights, power steering fluids, brake fluids and the like.

BACKGROUND ART

U.S. Pat. No. 3,692,004, Tangue, et al, issued Sep. 19, 1972, discloses a fan shroud and fluid storage chamber arrangement. Radiator fluid and windshield washer fluid chambers are provided integrally molded on opposite side surfaces of the cylindrical wall surrounding the air flow opening.

U.S. Pat. No. 5,649,587, Plant, issued Jul. 22, 1997, discloses a fan shroud and receptacle arrangement in which there is a shaped hollow body. Oppositely disposed recesses are formed in a front and rear face of the fan shroud to form a wall for dividing the hollow body into two or more internal fluid storage chambers.

Modern engine design often now includes a plurality of chambers for engine coolant fluid. The fluid must circulate through the radiator core for the usual cooling process. The cooling process is often supplemented by addition of a fan to enhance air flow through the radiator. The fan may be an electric fan independently powered from the engine or the fan may be attached to the engine and driven by a belt driven by the crank shaft. Heretofore it has been common for the vehicle to provide an overflow chamber so that when fluid is released from the radiator under pressure it flows into an overflow container. More recently with engine design, an additional chamber is desired. This chamber is subject to engine coolant temperatures and pressures.

There has therefore developed a need for a fluid storage system which is suited to handle the requirements of an engine coolant storage container.

SUMMARY OF THE INVENTION

The general object of the invention is to provide an improved, compact and efficient fan shroud with integral fluid receptacles, at least one of which is adapted to contain fluids at higher than ambient pressures.

In accordance with the invention a fan shroud comprises a housing, the housing having front and rear walls and top and bottom walls. The housing defines an opening to permit air flow through the front and back walls of the housing. The housing further defines, between the front and back walls, a plurality of fluid storage chambers. At least one of the fluid storage chambers comprises a plurality of individual storage modules and a plurality of fluid communication channels interconnecting each of the modules to at least one other of the modules. The advantage of the invention will become apparent when reference is made to the following description of a preferred embodiment of the invention and accompanying drawings, in which:

Figure 1:
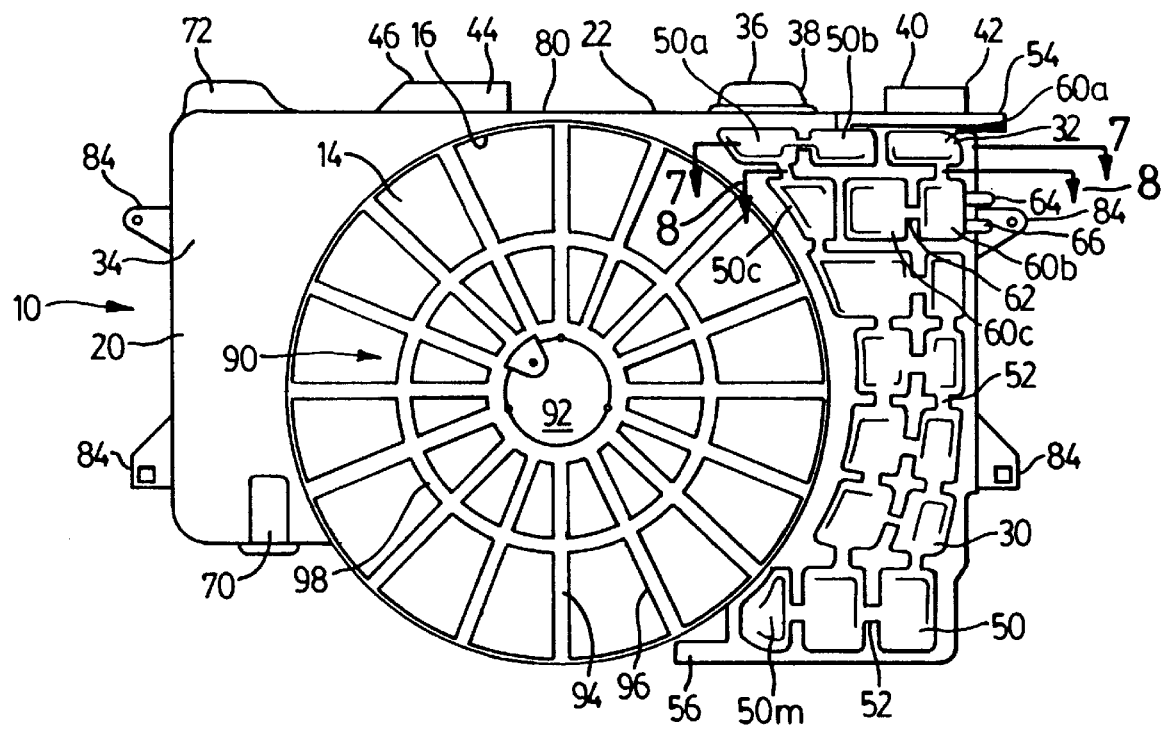
FIG. 1 is a rear view of a preferred embodiment of the invention.
Figure 2:
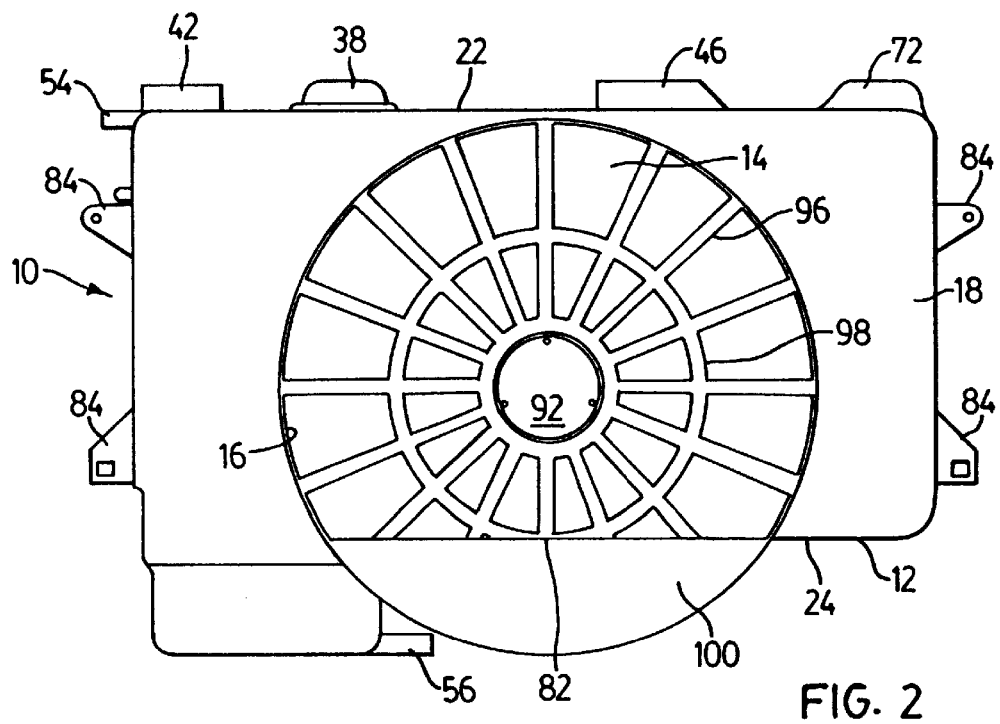
FIG. 2 is a front view of the embodiment of FIG. 1.

The fan shroud 10 is illustrated in FIGS. 1 and 2. The shroud 10 includes a housing 12. The housing 12 defines a generally centrally located opening 14. The opening 14 is defined by a generally cylindrical wall 16.

The housing 10 comprises a front wall 18 (FIG. 2) and a rear wall 20 (FIG. 1). In addition, the housing 12 comprises a top wall 22 and a bottom wall 24.

The housing defines a first chamber 30, a second chamber 32 and a third chamber 34. Each of chambers 30, 32 and 34 are closed chambers adapted to hold liquids typically requiring storage in automotive applications. The first chamber 30 is fitted with a filler access 36 located in the top wall 22 of the housing 12. The filler access 36 is closed by a cap 38. Removal of the cap 38 allows addition of fluid through the filler access 36 to the chamber 30. Second chamber 32 is fitted with a filler access 40. The filler access 40 is closed by means of a cap 42. Removal of cap 42 permits addition of fluid through filler access 40 to second chamber 32. Third chamber 34 comprises a filler access 44. The filler access 44 may be closed by means of a flap 46. Opening flap 46 permits addition of fluid to third chamber 34 through filler access 44.

First chamber 30 is adapted to contain pressurized engine coolant. In modern engines there is often a requirement for a chamber separate from the engine radiator. This chamber serves several different purposes. It serves the purpose of being a degas tank. That is to say, gases dissolved in the liquid can reduce the cooling efficiency of the radiator. Thus, means separate from the radiator are desired to permit the gases to be collected and occasionally removed as necessary. In addition, expansion of the fluid while maintaining the fluid under pressure is desirable and thus the chamber provides for an increase in the engine coolant volume as the cooling fluid is heated.

Typically, engines are designed to operate at temperatures exceeding the boiling point of water at sea level pressure. Thus, typical operating temperatures for engines may be in the order of 220° to 230° F. or 104° to 110° C. In order to prevent boiling of such fluids which typically would have boiling points of approximately 212° F. or 100° C. the fluids must be maintained under higher pressures. Thus, the operating system of the typical automobile will operate at a gauge pressure of 10 to 15 lbs per square inch. As will be well understood, automotive applications involve the vehicle being left in unheated atmospheres on a regular basis. Thus, the fluid in the engine cooling system during periods of non-use may cool down to below freezing temperatures. Typically, to prevent freezing of the fluid antifreeze is added to the fluid to provide the desired lowering of the freezing point so that the fluid does not become solid. This wide variation in temperature provides a challenge for the designer for containers for such fluids. The container must withstand the thermal cycle which may vary from less than freezing to higher than normal boiling point, while at the same time withstanding pressure spikes during high heat conditions such as engine shut down or heavy working loads which may be as high as 25 psi. Additionally, there is a thermal cycle between ambiant and operating temperatures each time the engine is started and stopped. Thus, such a fan shroud must not only withstand these heat and temperature conditions but also withstanding these extremes repetitively over the life of the vehicle.

In order to enable use of resins which are typically used in blow molding applications, first chamber 30, instead of comprising a single large chamber, comprises a plurality of individual storage modules 50. In the embodiment shown in the drawings, first chamber 30 comprises 14 such modules 50. Each module 50 is connected to at least one other module 50 by means of an interconnecting fluid flow channel 52. The array of modules 50 may be arranged from top to bottom throughout the housing 12 of the shroud 10. Conveniently, these are arranged to one side of the air flow opening 14. The 14 individual modules collectively comprise the storage volume of first chamber 30.

With reference to FIG. 1, the first chamber 30 comprises two modules 50a and 50b located just below and adjacent to the top wall 22 of the housing 12. Module 50a communicates with the filler access 36. In addition module 50a communicates with the next laterally adjacent module 50b and in addition, the module 50c immediately below module 50a by means of interconnecting fluid flow channels 52. All other modules 50 of chamber 30 comprise two or more interconnecting fluid flow channels 52 so that fluid within first chamber 30 may flow amongst all of the individual modules 50.

First chamber 30 includes an inlet 54 which communicates with module 50b. The first chamber 30 additionally includes an individual module shown in the lower left hand element of the chamber and marked 50m in FIG. 1. The first chamber 30 includes an outlet 56 which communicates with module 50m.

When the fan shroud is installed in a vehicle, the vehicle coolant system is connected to inlet 54 and to outlet 56. The connections to the vehicle cooling system can be done at any convenient point. When connected, coolant pumped by the coolant pump of the vehicle is circulated through the engine cooling system. As needed and desired, coolant is also circulated under pressure and at operating conditions through first chamber 30. The individual modules 50 of first chamber 30 are thus subjected to engine coolant temperatures and pressures.

In the embodiment illustrated in FIG. 1 the second chamber 32 also comprises a plurality of modules 60. In FIG. 1 second chamber 32 comprises three modules 60a, 60b and 60c. Module 60a communicates with filler access 40 so that fluid may be added to second chamber 32. Module 60b is in fluid communication with modules 60a and 60c by means of interconnecting fluid flow channels 62 so that fluid may flow within all three modules. The three individual modules thus collectively comprise the storage volume of second chamber 32. Module 60b includes an inlet 64 and an outlet 66.

Second chamber 32 is intended to contain fluid which may be under pressure from time to time. Such fluid may be power steering fluid. The inlet 64 and the outlet 66 communicate with the pumping apparatus of the power steering system. Fluid may thus flow into and out of second chamber 32 depending upon the volume requirements of the power steering system. The fluid can be supplied to second chamber 32 under pressure.

Third chamber 34 comprises substantially the entire volume between the front and back faces of housing 11 to the left of central opening 14 as viewed in FIG. 1. Third chamber 34 is intended to contain fluid which may not necessarily be under pressure. This may include washer fluid for use in washing windshield, headlamps and the like. Washer fluid may be poured into the third chamber 34 through the filler access 44. Third chamber 34 comprises a pump housing 70 located in the lower region thereof. Pump housing 70 may be fitted with a pump to deliver fluid from chamber 34 to windshield washer jets, headlight washer jets and the like.

Windshield washer fluid when used in the summer normally does not contain any antifreeze components. When winter or freezing conditions are anticipated, washer fluid should preferably contain antifreeze components. However, because seasonal change can occur unexpectedly, preferably third chamber 34 comprises means to provide expansion which might occur under freezing conditions if the fluid contained within the chamber is capable of freezing at ambient temperatures. To handle this possibility, third chamber 34 includes an expansion chamber 72. The expansion chamber 72 is located in the upper wall of the housing 12 and provides a volume which is typically of approximately 10% of the remainder of the volume of third chamber 34. Because the expansion chamber is located substantially on the same horizontal level as filler access 44, the expansion chamber will be filled with gas under normal operating conditions and will thus be available to take expansion of the fluid within the chamber if the fluid expands as in freezing conditions.

The housing of the fan shroud comprising the first, second and third chambers may most conveniently be made in a blow molding process. A parison will be extruded and the mold closed about the parison in the usual fashion. When blowing pressure is applied to the interior of the parison, the front, back, top and bottom walls of the housing are given their external configuration by the mold configuration. The internal space between the walls of the parison then forms the interior of the housing 12.

In order to create the enclosure which is the third chamber 34, a generally horizontal pinch region 80 is formed substantially adjacent the top wall 22 and the cylindrical wall 16 by the mold closure. A similar generally horizontally extending pinch region 82 is formed adjacent the lower wall 24 and the cylindrical wall 16. The pinch regions 80 and 82 are substantially diametrically opposite one another with respect to the opening 14. In FIG. 1 the third chamber 34 thus comprises substantially half the interior volume of the fan shroud.

First and second chambers 30 and 32 respectively are also manufactured during the blow molding process. As shown in FIG. 1 the front wall 18 of the housing 12 is substantially flat with no projections or recesses. The rear wall 20 however is multi-contoured to create the individual modules and interconnecting fluid flow channels. In this case the individual modules are closed units which have substantially domelike or trapezoidal shape. One wall of each module is comprised of the front wall 18. The remainder of the periphery of each module is comprised of rear wall 20. Similarly, each of the interconnecting fluid flow channels 52 and 62 are comprised of a space between the front wall 18 which is generally planar and a curved portion of back wall 20.

Figure 7:
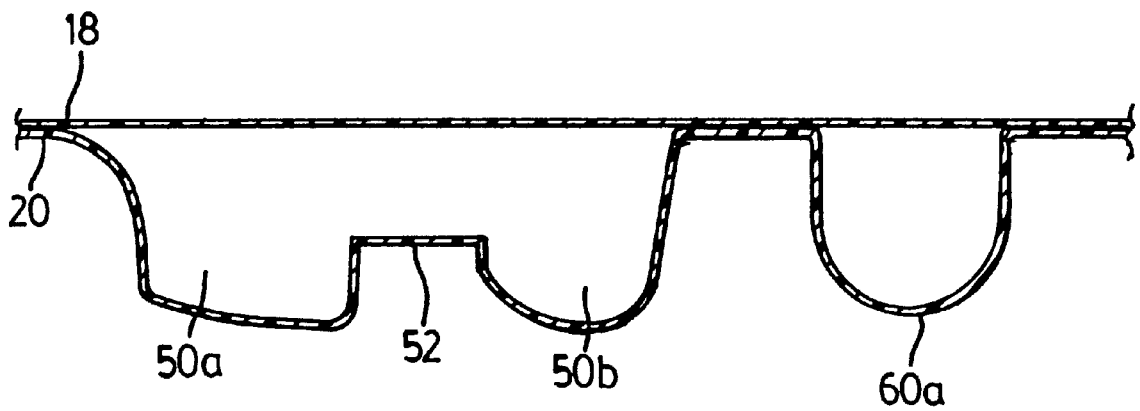
FIG. 7 is a partial section view along line 7—7 of FIG. 1.

FIG. 7 illustrates a partial cross-section at line 7—7 in FIG. 1. This shows a relatively planar front wall 18 and the curvilinear back wall 20 defining the modules 50a, 50b and 60a as well as the fluid channel 52 interconnecting modules 50a and 50b.

Figure 8:
FIG. 8 is a partial section view along line 8—8 of FIG. 1.

FIG. 8 illustrates a partial cross-section at line 8—8 of FIG. 1. This shows the relatively planar front wall 18 and the curvilinear back wall 20 forming one interconnecting channel 52 between module 50a and 50c and the interconnecting channel 62 between module 60a and module 60b.

To the right of the pinched regions 80 and 82 of the housing 12 as shown in FIG. 1, the front wall 18 and the rear wall 20 are brought into contact with one another during the molding process so that on blow molding the air pressure is directed only into the interior of the parison to form the modules 50 and 60 and the flow channels 52 and 62. Thus, each module 50 and 60 and each channel 52 and 62 is defined by a double thickness of parison material. This gives much better structural support to the comparatively small individual modules and channels as compared to the support for chamber 34. Thus, each of chambers 30 and 32 are adapted to store liquids under much higher pressures than chamber 34.

The fan shroud 10 also includes four mounting lugs 84. The lugs 84 can be used to hold fasteners such as bolts or screws to attach the fan shroud 10 to a vehicle. The fan shroud may be mounted to the vehicle radiator or other convenient body structure. The lugs 84 may be made by compression molding of the parison during closure of the blow molding dies.

The fan shroud of the present invention may be utilized with automotive engines which have fans powered by the vehicle engine. If the fan is powered by the engine then the central opening 14 will be free of any other structure permitting air flow directly through the shroud as directed by the cylindrical wall 18. However, in many automotive applications the vehicle is equipped with a fan which is driven by an electric motor which is controlled by a thermostatic switch to maintain desired temperatures of water leaving the radiator. With an electrically driven fan the need arises to have a convenient spot to mount the fan. In the embodiment shown in FIGS. 1 and 2 the fan shroud comprises a base mounting means for mounting a fan motor to the fan shroud. The base mounting means illustrated generally at 90 comprises a mounting bracket 92 and a spider 94. The spider 94 comprises a plurality of struts 96. The struts 96 radiate outwardly from the mounting bracket 92 toward the periphery of the cylindrical wall 18. As shown in FIG. 1, the struts 96 may be reinforced by a generally circular rib 98 intermediate the mounting bracket 92 and the cylindrical wall 18.

The base mounting means 90, comprising the mounting bracket 92 and the spider 94 may conveniently be molded in an injection mold. The housing 12 may conveniently be manufactured by a typical blow molding process. The base mounting means 90 can then be attached to the housing 12 by means of electrosonic welding, adhesives or the like. The attachment of the base mounting means 90 to the cylindrical wall 12 can be made at the intersection of each strut 96 with the cylindrical wall 18. This system allows for designing the housing 12 with other structure as may be required by the particular vehicle. In the embodiment shown in FIGS. 1 and 2, the fan shroud comprises a forwardly extending cross member 100 to meet other requirements of the vehicle. The presence of cross-member 100 effectively precludes the base mounting means 90 from being manufactured at the same time as the blow molded housing 12 as the structure would otherwise be die locked.

Where the vehicle structure does not require a cross-member such as member 100 illustrated in FIGS. 1 and 2, then as an alternative, the base mounting means 90 may be manufactured at the same time the housing 12 is created. In order to create a base mounting means 90 as shown in FIGS. 1 and 2, two die halves may be configured to compress parison material to mold the mounting bracket 92 and the spider 94 between the contours of the die halves. When such a system is used then the flash between the struts 96, the cylindrical wall 18, the rib 98 and the mounting bracket 92 would have to be removed after the blow molding process is completed.

One of the principal advantages of the present invention is that it then reduces the overall part costs. The one piece design as shown in FIGS. 1 and 2 reduces the packaging space that would otherwise be required by a fan shroud and multiple containers for fluids used in the vehicle. In addition, the unit of FIGS. 1 and 2 provides a single unit comprising a fan shroud, three separate liquid storage containers and a fan all as a single sub-assembly. The sub-assembly may be assembled before introduction into the vehicle. The sub-assembly is then affixed to the vehicle by means of suitable fasteners passed through the four mounting lugs 84 on either side of the housing 12.

Figure 3:
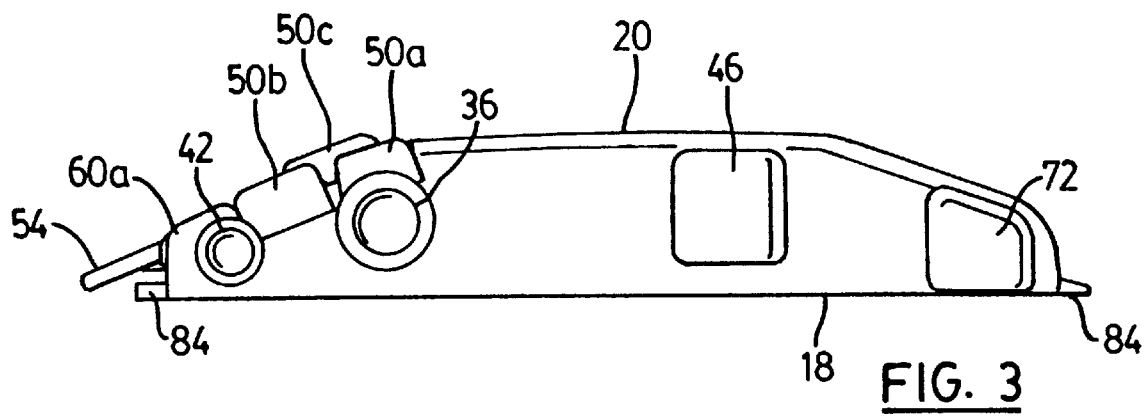
FIG. 3 is a top view of the embodiment of FIG. 1.
Figure 4:
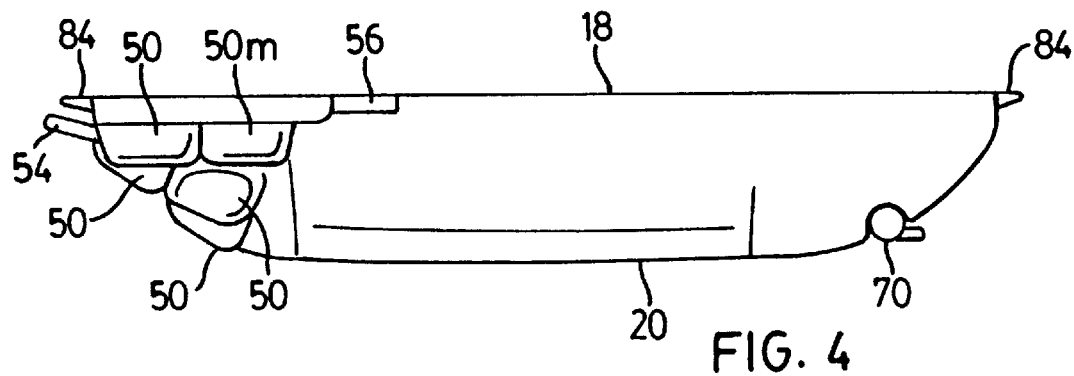
FIG. 4 is a bottom view of the embodiment of FIG. 1.
Figure 5:
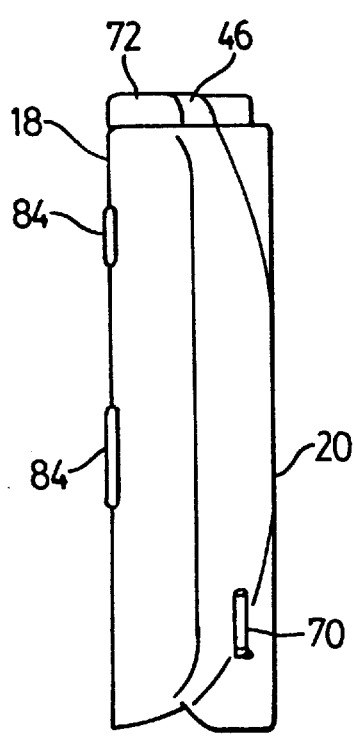
FIG. 5 is a right side view of the embodiment of FIG. 1.
Figure 6:
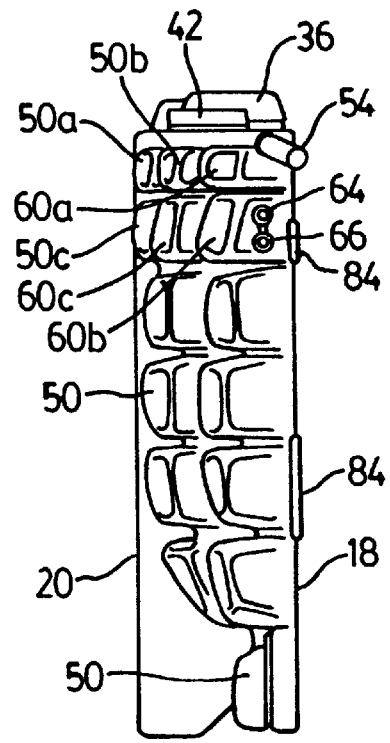
FIG. 6 is a left side view of the embodiment of FIG. 1.

As shown particularly in FIGS. 3 and 4, the rear wall 20 of the housing 12 is curvilinear. The curvilinear shape of the rear wall 20 adds to the strength of the unit and eliminates the need for separate side walls, particularly in the region of storage chambers 30 and 32. However, the housing can be configured to have separate side walls if desired.

Various other embodiments and changes may be made to the invention. The embodiment illustrated herein is to be taken as illustrative only. The full scope of the invention is set out in the appended claims.

We claim:

1. A fan shroud comprising a housing, said housing having front and rear walls, and top and bottom walls, said housing defining an opening for permitting air flow through said front and rear walls said front and rear walls each being defined between coextensive, substantially continuous surfaces defining therebetween uniform thickness, of said housing, said housing further defining between said front and back walls, at least two molded fluid storage chambers, said at least two molded fluid storage chambers being comprised of a one piece housing comprised of said front and back walls;

at least one of said molded fluid storage chambers comprising a plurality of individual storage modules and a plurality of interconnecting fluid flow channels interconnecting each said module to at least one other of said modules, and wherein said front and back walls are joined to each other adjacent each of said modules and said channels to define and support each said module and each said channel.

2. The device of claim 1 wherein said fan shroud comprises at least two said molded fluid storage chambers and each said molded fluid storage chamber comprises individual storage modules and interconnecting fluid flow channels as defined in claim 1.

3. The device of claim 1 wherein said fan shroud comprises at least three said molded fluid storage chambers and at least a first and a second said molded fluid storage chamber comprise individual storage modules and interconnecting fluid flow channels as defined in claim 1.

4. The device of claim 1 wherein said at least one of said molded fluid storage chambers comprises inlet and outlet means for flow of circulating fluid.

5. The device of claim 4 wherein said at least one fluid storage chamber includes a filler access for addition of liquid to said fluid storage chamber.

6. The device of claim 1 wherein said at least two molded chambers comprise inlet and outlet means for flow of fluid.

7. The device of claim 6 wherein said fan shroud includes at least first, second and third chambers and said fan shroud includes pump means for delivering fluid from said third chamber, and said third chamber includes a filler access for addition liquid to said third chamber.

8. The device of claim 7 wherein said fan shroud includes a plurality of mounting lugs for mounting said shroud to a vehicle.

9. The device of claim 7 wherein said third chamber includes an expansion container and said expansion chamber is located in said top wall of said fan shroud.

10. The device of claim 9 wherein said fan shroud comprises base mounting means for mounting a fan motor to said fan shroud.

11. The device of claim 10 wherein said base mounting means comprises a mounting bracket and a spider, said spider comprising a plurality of radially extending struts radiating outwardly from said mounting bracket toward the periphery of said centrally located opening.

* * * * *

UNITED STATES PATENT AND TRADEMARK OFFICE
CERTIFICATE OF CORRECTION

PATENT NO. : 5,971,062
DATED : October 26, 1999
INVENTOR(S) : Changize Sadr, Timothy W. Chapman It is certified that error appears in the above-identified patent and that said Letters Patent is hereby corrected as shown below:

At column 6, commencing with "A fan shroud comprising...." and ending with "....and each said channel." delete claim 1 as issued and replace with:

1. A fan shroud comprising a seamless housing, said housing having front and rear walls, and top and bottom walls,
   said front and rear walls each being defined between coextensive, substantially continous surfaces defining therebetween a substantially uniform thickness,
   said housing defining an opening for permitting air flow through said front and rear walls of said housing,
   said housing further defining between said front and rear walls, at least two molded fluid storage chambers, formed entirely from said front and rear walls,
   at least one of said molded fluid storage chambers comprising a plurality of individual storage modules and a plurality of interconnecting fluid flow channels interconnecting each said module to at least one other of said modules,
   and wherein said modules and said channels are formed exclusively from portions of said front and rear walls, and
   said front and rear walls are joined to each other about a periphery of each said module and each said channel to define and support each said module and each said channel.

Column 4,
Line 57, delete "back" and insert "rear" between "curvilinear" and "wall"
Line 62, delete "back" and insert "rear" between "curvilinear" and "wall"

Signed and Sealed this

Twenty-fourthDay of July, 2001

*Attest:*

*Attesting Officer*

NICHOLAS P. GODICI
*Acting Director of the United States Patent and Trademark Office*